United States Patent [19]

Grasso et al.

[11] Patent Number: 5,726,105

[45] Date of Patent: Mar. 10, 1998

[54] COMPOSITE ARTICLE

[75] Inventors: Albert P. Grasso, Vernon, Conn.; Ronald G. Martin, Monson, Mass.; Robert P. Roche, Cheshire, Conn.

[73] Assignee: International Fuel Cells, South Windsor, Conn.

[21] Appl. No.: 425,282

[22] Filed: Apr. 20, 1995

[51] Int. Cl.⁶ ............................................. D04H 1/08
[52] U.S. Cl. .................. 442/326; 264/29.4; 264/29.5; 264/29.6; 264/29.7; 264/105; 423/447.1; 423/447.2; 423/447.4; 423/447.8; 423/448; 428/902
[58] Field of Search ............................ 264/29.4, 29.5, 264/29.6, 29.7, 105; 428/280, 281, 408, 902; 442/326; 423/447.1, 447.2, 447.4, 447.8, 448

[56] References Cited

U.S. PATENT DOCUMENTS

| | | | |
|---|---|---|---|
| 4,301,222 | 11/1981 | Emanuelson et al. | 429/251 |
| 4,360,485 | 11/1982 | Emanuelson et al. | 264/29.5 |
| 4,374,906 | 2/1983 | Breault et al. | 429/44 |
| 4,426,340 | 1/1984 | Goller et al. | 264/29.1 |
| 4,627,944 | 12/1986 | Murakami et al. | 264/29.4 |
| 4,670,300 | 6/1987 | Stewart, Jr. | 427/115 |
| 4,737,421 | 4/1988 | Uemura et al. | 429/34 |
| 4,822,538 | 4/1989 | Yoshida et al. | 264/29.4 |
| 4,851,304 | 7/1989 | Miwa et al. | 429/40 |
| 5,093,214 | 3/1992 | Saito et al. | 429/44 |

FOREIGN PATENT DOCUMENTS

| | | |
|---|---|---|
| 0307968 | 3/1989 | European Pat. Off. . |
| 0466962 | 1/1992 | European Pat. Off. . |
| 0495700 | 1/1992 | European Pat. Off. . |
| 7222193 | 2/1973 | France . |
| 59-154773 | 1/1985 | Japan . |
| 60-037670 | 7/1985 | Japan . |
| 1005974 | 1/1989 | Japan . |
| 4214072 | 1/1989 | Japan . |
| 57209883 | 1/1991 | Japan . |
| 1410090 | 10/1975 | United Kingdom . |
| 2083012 | 3/1982 | United Kingdom . |

Primary Examiner—James J. Bell

[57] ABSTRACT

The graphitized composite article of the present invention is formed by embedding carbon fiber felt in a matrix of a carbon filler; a thermosetting resin and a solvent; curing the composite article; then, carbonizing and graphitizing the cured composite article to form the graphitized composite article for use as a separator plate capable of substantially inhibiting mixing of hydrogen and oxygen and/or the loss of electrolyte within a fuel cell stack. The graphitized composite article may be a graphitized laminate.

11 Claims, 1 Drawing Sheet

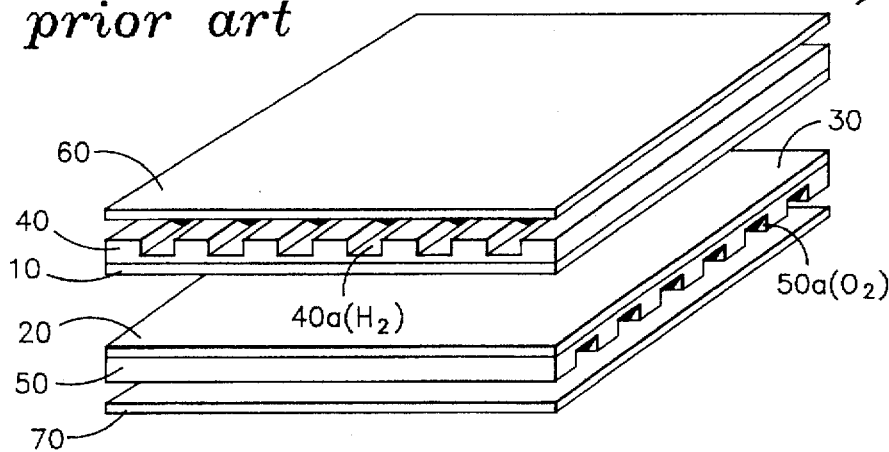
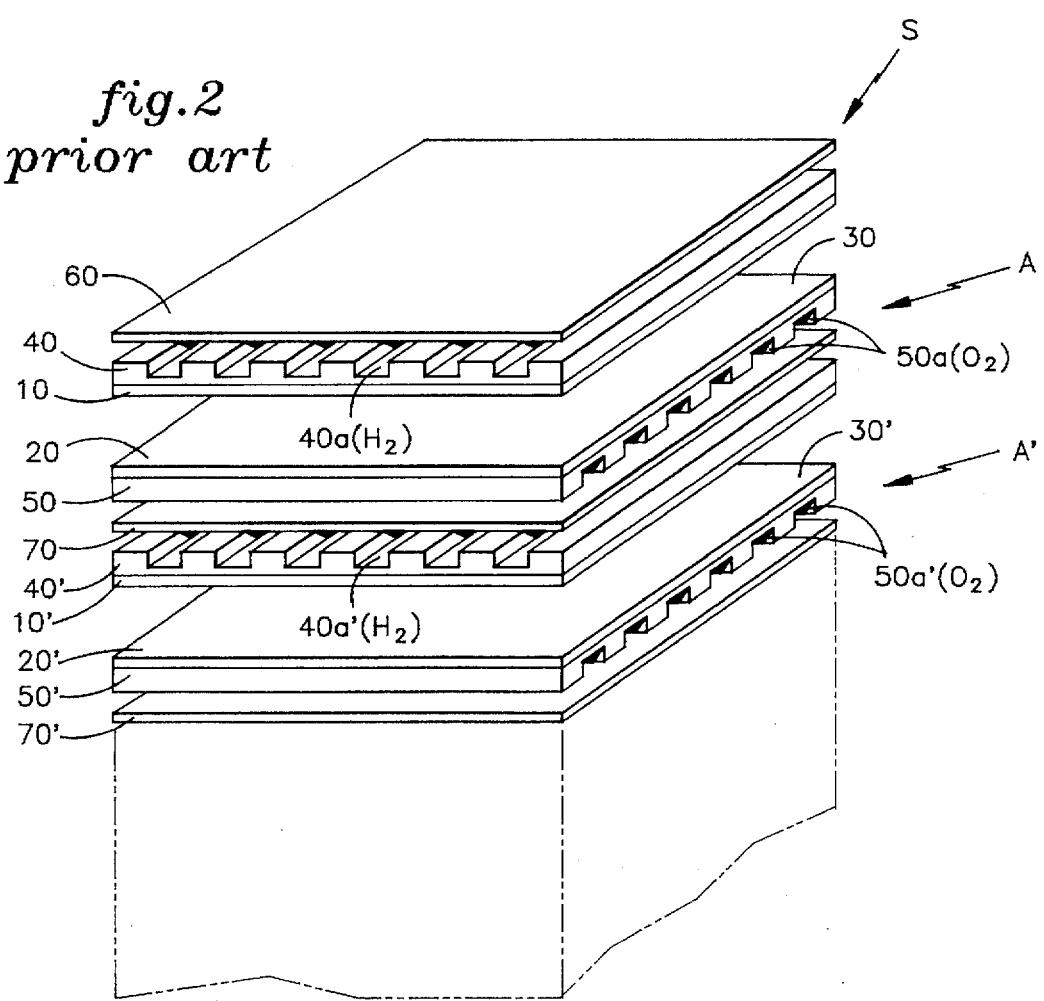

COMPOSITE ARTICLE

TECHNICAL FIELD

The present invention relates to a fuel cell stack, and more particularly, to a composite article therefor.

BACKGROUND OF THE INVENTION

A fuel cell produces electricity by electrochemically consuming a fuel, typically hydrogen, and an oxidant, such as oxygen. Fuel cells are well known devices. Refer to FIG. 1, a prior art exploded view of a fuel cell. Generally, the fuel cell A has an anode electrode 10 for receiving the hydrogen and a cathode electrode 20 for receiving the oxygen. The anode electrode 10 is spaced from the cathode electrode 20 with an electrolyte 30 disposed therebetween. Each electrode includes a substrate with a catalyst layer (not shown) on one surface where the catalyst layer is in contact with the electrolyte. An anode and a cathode electrolyte reservoir plate 40 and 50 are disposed on either side of the anode and the cathode electrodes, respectively. The anode electrolyte reservoir plate 40 has grooves, represented by the groove 40a, for providing hydrogen to the anode electrode 10. The cathode electrolyte reservoir plate 50 has grooves, represented by the groove 50a, for providing oxygen to the cathode electrode 20. A separator plate 60 is disposed adjacent to the anode electrolyte reservoir plate 40. A separator plate 70 is disposed adjacent to the cathode electrolyte reservoir plate 50. Separator plates are well known components of fuel cell stacks. The separator plates act as a barriers to prevent the electrolyte from migrating from one fuel cell to another and to help prevent the mixing of the hydrogen and the oxygen disposed on opposite sides of the separator plate.

Refer to FIG. 2, a prior art exploded view of a fuel cell stack. The fuel cell stack S is composed of individual fuel cells A and A' aligned electrically in series.

In operation, referring to FIG. 2, the hydrogen from the electrolyte reservoir plate 40 contacts the anode catalyst layer (not shown) where it is converted into hydrogen ions and free electrons. The hydrogen ions migrate from the anode electrode 10 across the electrolyte 30 to the cathode electrode 20. Free electrons pass from the anode electrode 10' through the anode electrolyte reservoir plate 40' and separator plate 70 to the adjacent cathode electrolyte reservoir plate 50, and subsequently, the cathode electrode 20. At the catalyst layer of the cathode 20, the free electrons from the anode 10' and the oxygen react with the hydrogen ions from the anode 10 enabling this described electrochemical process to be continuous and to produce electrical power by the effective electron flow through the cell stack and its connected external circuit.

Due to the barrier function of the separator plates, they must be highly impermeable to the electrolyte and the hydrogen and oxygen. As mentioned above, the free electrons from one fuel cell are utilized by the adjacent fuel cell at the cathode catalyst. Since these electrons must travel through the separator plates, the separator plates must also be highly electrically conductive.

There are two major problems with conventional separator plates, which are: first, the separator plates' permeability increases over the operative life of the fuel cell stack; and, second, the separator plates are too expensive. Conventional separator plates initially maintain low permeability, but generally develop permeability which can decrease the efficiency of the fuel cell stack. When separator plates are manufactured, those that cannot be used decrease the yield and increase the cost per separator plate. Consequently, what is needed in the art is a high yield separator plate capable of substantially preventing permeability of reactants for at least about 40,000 hours of fuel cell stack operation.

DISCLOSURE OF THE INVENTION

According to the present invention, a method for making a graphitized composite article and a graphitized composite article produced by the method are disclosed. The method comprises the step of forming an uncured composite article of carbon fibers embedded within a matrix of a carbon filler, a thermosetting resin and a solvent. Secondly, the method includes removing substantially all of the solvent from the uncured composite article. Then, applying pressure and heat to the uncured composite article to produce a cured, compressed composite article. Next, heating the cured compressed composite article to a first temperature, thereby producing a carbonized composite article wherein the carbon fibers, the carbon filler and the resin are substantially carbonize. Lastly, the method requires heating the carbonized composite article to a second temperature higher than the first temperature, thereby producing a graphitized composite article, whereby the graphitized composite article is substantially impermeable to gases and liquids. The above method can include stacking up a plurality of uncured composite articles forming a lay-up; applying pressure and heat to produce cured, compressed composite articles which are bonded to one another forming a laminate; and carbonizing and graphitizing the laminate.

The foregoing and other features and advantages of the present invention will become more apparent from the following description.

BRIEF DESCRIPTION OF THE DRAWINGS

FIG. 1 is a prior art exploded view of a fuel cell.

FIG. 2 is a prior art exploded view of a fuel cell stack.

These figures are meant to be exemplary and not to limit the generally broad scope of the present invention.

BEST MODE FOR CARRYING OUT THE INVENTION

One embodiment of the graphitized composite article for use as a separator plate in a fuel cell stack of the present invention is generally made by forming an uncured composite article of carbon fiber felt embedded within a matrix of a carbon filler, a thermosetting resin and a solvent; curing the composite article; and carbonizing and graphitizing the cured composite article.

The carbon fibers impart structural integrity to the composite article in this embodiment the carbon fibers are in the form of a carbon fiber felt. "Felt" means the carbon fibers are in an interlaced network forming a dense mat. This mat has voids between the strands of carbon fibers.

Typically, the carbon fiber felt is formed by carbon fibers and a binder system. The carbon fiber felt should be chosen based on the shrinkage characteristics of the carbon fibers, the strength of the carbon fibers, the length of the carbon fibers, and the nature of the binder system. The strength of the carbon fibers within the felt selected should be sufficient enough to maintain the structural integrity of the composite article during processing and subsequent use. The length of the carbon fibers must be such that the carbon fibers are long enough for the felt to have sufficient integrity, however, short enough not to tangle to the point where fiber bundles are formed. A bundle is a dense cluster of carbon fibers which is difficult to impregnate with the matrix. A preferred distribution of carbon fiber lengths is a carbon fiber felt having about 85% of the carbon fibers with an approximately ¼" length and about 15% of the carbon fibers with an approximately 1" length. Non-woven carbon fiber felt is preferred.

The binder system, which holds the carbon fibers together is selected based on its carbon yield, compatibility with the matrix and the fuel cell environment, and its ability to be processed without the formation of voids. A preferred binder system is one with a high carbon yield, approximately 50% or greater, such as a phenolic binder system. However, a binder system with a lower carbon yield can be used, such as polyester, so long as it is dispersed or removed by the impregnation process prior to heat treatment. Removing the lower carbon yield binder prior to heat treatment prevents void formation in the graphitized composite article. The quantity of the carbon fibers and the binder system is generally based on process parameters. The carbon fiber felt is commercially available and formed by conventional techniques commonly known in the art.

The matrix combines the carbon filler, the thermosetting resin, and the solvent. The carbon filler must be chosen based on particle size and high purity. The particle size must be sufficiently large to remain substantially fixed within the voids of the carbon fiber felt during subsequent processing, yet sufficiently small to penetrate the voids of the carbon fiber felt. In addition, the carbon filler chosen should have a high purity because an impurity of any material other than graphite can cause voids or pin holes to form during heat treatment. The preferred carbon filler is synthetic graphite due to its compatibility with fuel cell environment. It is preferred that the carbon filler be seived through a 150 mesh screen to improve uniformity and to control final purity.

The thermosetting resin fills the voids around the carbon filler and binds the carbon fibers and filler together. The thermosetting resin should have a carbon yield of 50% or greater, for the same reason as the binder system. The preferred thermosetting resin is a phenolic resin. Recommended thermosetting resins which can be employed are mixtures of phenolic resins and other conventional high carbon yield resins, such as pitch.

The solvent aids the phenolic resin and the carbon filler in dispersing and filling the voids. The solvent chosen should be easily removed from the carbon fiber felt by subsequent processing, while leaving minimal residual upon removal. An alcohol, such as ethanol or methanol, is recommended.

The matrix must be mixed with a high energy mixer so that an even blend is achieved. An example of a commercially available mixer for such a blend is a disk cavitation mixer.

The uncured composite article is formed by any means which gets the carbon filler within the voids of the carbon fiber felt and the thermosetting resin around the carbon filler. One method of forming the uncured composite article is dipping the carbon fiber felt in a bath of the matrix, as known by those of ordinary skill in the art.

Next, substantially all of the solvent must be removed from the uncured composite article. This removal may be done by any conventional process, but it is preferred to oven dry the uncured composite article. Oven drying produces a substantially uniformly impregnated felt. Sufficient drying is achieved when a certain level of test volatility is achieved. The volatility is the degree of drying of the dried, uncured composite article measured by the subsequent weight loss percent encountered when oven cured. The volatility attained should not result in significant curing of the resin. A volatility of less than about 10% is recommended, with around 5% being preferred.

Another check for sufficient oven drying is testing for adequate flow. Pressure and heat are applied to the dried, uncured composite article to compress the composite article and cure the resin to produce a cured compressed composite article. A lab press system is used. The appropriate amount of drying and curing of the resin is measured by the amount of flow. The flow is the weight percent of excess plan-form trimmed from a sample after applying the pressure and heat. The pressure and heat should be applied at consistent test conditions. An example is applying 1000 psi at 325° F. for a 4"×4" sample with a 20% flow being acceptable.

The dried, uncured composite article is preferably densified by applying heat and pressure without curing the resin to expel entrapped air which aids in closing voids to produce an uncured, compressed composite article. When densification is done, the next step is to apply heat and pressure (i.e., press curing) to the uncured, compressed composite article to produce a cured, compressed composite article. This press curing allows the resin to cross-link and limits distortion of the article which may occur during subsequent heat treatment. Now, the cured, compressed composite article can be carbonized and graphitized.

It is preferred that a plurality of uncured compressed composite articles be stacked to form a lay-up. The use of a plurality of uncured compressed composite articles improves the reliability of the finished part by reducing the significance of an imperfection in any single uncured compressed composite article.

When using a plurality of composite articles, the number of composite articles stacked is based on the desired thickness of the finished part, and the thickness of each compressed composite article, accounting for shrinkage. Stacking-up the compressed composite articles can be accomplished in any fashion commonly known in the art such as at 180° or 90° of the previous compressed composite article. In order to eliminate possible varied shrinkage of the layers, it is preferred that the adjacent compressed composite articles be at 180° relative rotations from one another.

Now, pressure and heat are applied to the lay-up, such that the adjacent uncured compressed composite articles are cured and bonded to one another forming a laminate. The pressure and temperature applied are dependent upon the type of thermosetting resin used and are readily determined by one skilled in the art. For phenolic resin, for example, temperatures typically range from about 275° F. to about 330° F., and pressures range from 500 psi up to about 4,000 psi, with pressures up to about 1,000 psi more commonly employed.

Following forming the laminate by lamination, the laminate is heat treated. First, the laminate is heated to a first temperature producing a carbonized laminate. In the carbonized laminate, the carbon fibers, the carbon filler and the resin are substantially carbonized. Next, the carbonized laminate is heated to a second temperature, higher than the first temperature producing a graphitized laminate. In the graphitized laminate, the carbon fibers and filler are graphitized and the resin is in the form of a graphitized resin char. The graphitized laminate is substantially impermeable to gases and liquids. The graphitized laminate made by this method can be used as a separator plate. This type of separator plate has improved chemical corrosion resistance for its intended use in a fuel cell environment and the resulting shrinkage reduces porosity, thereby reducing the potential for electrolyte loss through the separator plate. The graphitized composite article chosen should have approximately less than about 2% shrinkage in the x-y plane (length-width) during heat treatment, and approximately 25% shrinkage in the z plane (thickness).

Carbonization and graphitization heat treatment techniques are conventional. These heat treatment processes are typically conducted in an inert atmosphere by raising the temperature from ambient temperature (about 77° F.) to about 1,500° F. or higher and from ambient temperature to about 4,500° F. or higher, respectively. In both processes, temperature elevation is preferably gradual, often over a period of days or even weeks. The slow heat-up rates address the concerns relating to thermal stresses and gas release voids.

If a single compressed composite article is used, the carbonization produces a carbonized composite article and the graphitization produces a graphitized composite article. If multiple composite articles are laminated, the carbonization produces a carbonized composite article or carbonized laminate and the graphitization produces a graphitized composite article or graphitized laminate.

EXAMPLE

The following example has been used to form an approximately 0.030 inch thick graphitized laminate of the present invention.

1. Select and cut the carbon fiber felt to approximately the desired final separator plate width accounting for shrinkage during processing. The carbon fiber felt used was commercially available non-woven carbon fiber felt produced by the Veratec Division of International Paper under the name Carbon Fiber Felt Product 1 oz/yd$^2$ Veratec P/N Series 8000627.

2. The carbon filler used was commercially available Synthetic Graphite produced by Dixon Ticonderoga Co. under the name Synthetic Graphite—GRADE 1377. The carbon filler selected has a particle diameter between about 0.5 microns to about 50 microns, and, more precisely, between about 1.6 microns to about 20 microns. Seiving the carbon filler through a 150 mesh screen.

3. The thermosetting resin used was commercially available phenolic resin produced by Plastics Engineering Co., (PLENCO) under the name Phenolic Resin Grade 12285.

4. The solvent used was methanol.

5. Mix the matrix by combining 26% carbon filler (i.e., Synthetic Graphite), 34% thermosetting resin (i.e., Phenolic Resin), and 40% solvent (i.e., methanol).

6. Impregnating the carbon fiber felt with the matrix to form an uncured composite article with a total weight of 410 grams per square meter.

7. Remove substantially all of the solvent from the uncured composite article to a volatility of approximately 5%.

8. Densifying the dried, uncured composite article by applying pressure and heat to produce an uncured compressed composite article. Using a press for about 1,000 pounds per square inch (psi) at about 145° F. for about one minute to each layer of dried, uncured composite article.

9. Make a plurality of the uncured compressed composite articles by the steps above.

10. Stacking four uncured compressed composite articles at 180° relative to one another to form a lay-up.

11. Applying pressure and heat to the lay-up such that the adjacent uncured, compressed composite articles are cured and bonded to one another forming a laminate. The application of pressure and heat is done by placing composite article in a lamination press at 295° F. and 1,000 psig for six minutes.

12. Micro grind the laminate with a 180 girt sandpaper on one side to a 0.038 inch thickness.

13. Heating the laminate to a first temperature thereby producing a carbonized laminate. The carbonization cycle was in a seven hour heat up from ambient temperature to 250° F. followed by a 3° F./hr heat up to 1110° F. and 8° F./hr heat up to 1550° F. and naturally cooling in the oven to ambient temperature.

14. Heating the carbonized laminate to a second temperature thereby producing a graphitized laminate. The graphitization cycle was in a 120° F./hr heat up to 1,470° F. followed by a 75° F./hr heat up to 4,350° F. Then, holding at 4,350° F. for four hours and naturally cooling in the oven to ambient temperature.

The obtained graphitized laminate formed in the above example had material properties as follows: density: 1.73 gms/cc; porosity: 15.5%; median pore diameter: of 0.01 µM; flexure strength: 13,600 psi; thickness: 0.028 inches; and, resistivity: 0.027 ohm-cm.

The laminate of the above example has the following preferred ranges of components: between about 2 to about 15 weight percent of said carbon fibers, between about 20 to about 60 weight percent of said carbon filler, and between about 40 to about 65 weight percent of said thermosetting resin. The laminate of the above example has the following most preferred ranges of components: between about 5 to about 12 weight percent of said carbon fibers, between about 34 to about 44 weight percent of said carbon filler, and between about 47 to about 60 weight percent of said thermosetting resin.

The graphitized laminate of the above example has the following preferred ranges of components: between about 5 to about 17 weight percent of said carbon fibers, between about 35 to about 65 weight percent of said carbon filler, and between about 20 to about 50 weight percent of a resin char. The graphitized laminate of the above example has the following preferred ranges of components: between about 7 to about 15 weight percent of said carbon fibers, between about 48 to about 58 weight percent of said carbon filler, and between about 29 to about 41 weight percent of a resin char. However, the amounts of components in the graphitized laminate may vary with the temperatures used in carbonization and graphitization.

The present invention is a graphitized laminate and a method for making the graphitized laminate, which can be used as a separator plate for a fuel cell. The separator plate is believed to substantially prevent permeability of reactants for up to and exceeding about 40,000 hours. Additional advantages of this separator plate may include: improved product reliability, reduced sensitivity to isolated defects within a single composite article when a laminate is formed of several composite articles, significantly increased yield due to the reduction of warping problems experienced by prior art separator plates during production, thus a Dower effective unit cost.

While a particular invention has been described with reference to illustrated embodiments, this description is not meant to be construed in a limiting sense. It is understood that although the present invention has been described in a preferred embodiment, various modifications of the illustrative embodiments, as well as additional embodiments of the invention, will be apparent to persons skilled in the art upon reference of this description without departing from the spirit and scope of the invention, as recited in the claims appended hereto. It is therefore contemplated that the appended claims will cover any such modification or embodiments that fall within the true scope of the invention.

We claim:

1. A graphitized composite article made by the method of:

forming an uncured composite article having carbon fiber embedded within a matrix of a carbon filler, a thermosetting resin and a solvent;

removing substantially all of the solvent from said uncured composite article;

applying pressure and heat to said uncured composite article to produce a cured compressed composite article;

heating said cured compressed composite article to a first temperature thereby producing a carbonized composite article, wherein the carbon fiber, the carbon filler and the resin are substantially carbonized; and heating the carbonized composite article to a second temperature higher than the first temperature, thereby producing a graphitized composite article; whereby the graphitized composite article is substantially impermeable to gases and liquids.

2. The graphitized composite article of claim 1, wherein the graphitized composite article further comprises:

between about 2 to about 15 weight percent of said carbon fiber;

between about 20 to about 60 weight percent of said carbon filler; and between about 40 to about 65 weight percent of said thermosetting resin.

3. The graphitized composite article of claim 1, wherein the graphitized composite article further compirses:

between about 5 to about 12 weight percent of said carbon fiber;

between about 34 to about 44 weight percent of said carbon filler; and between about 47 to about 60 weight percent of said thermosetting resin.

4. The graphitized composite article as in claim 1, wherein said carbon fiber is in the form of a carbon fiber felt.

5. The graphitized composite article as in claim 1, wherein said thermosetting resin has a carbon yield of approximately 50% or greater.

6. The graphitized composite article as in claim 1, wherein said thermosetting resin is a phenolic resin.

7. The graphitized compsoite article as in claim 1, wherein said carbon filler is seived.

8. The graphitized composite article as in claim 7, wherein said carbon filler is seived through a 150 mesh screen.

9. A graphitized composite article, which comprises: between about 5 to 17 weight percent of a graphitized carbon fiber; between about 35 to about 65 weight percent of a graphitized carbon filler; and between about 20 to 50 weight percent of a graphitized resin char, such that the composite article is substantially impermeable to gases and liquids.

10. The graphitized composite article of claim 9, wherein the graphitized composite article further comprises:

between about 7 to about 15 weight percent of said graphitized carbon fibers;

between about 48 to about 58 weight percent of said graphitized carbon filler; and between about 29 to about 41 weight percent of said graphitized resin char.

11. The graphitized composite article as in claim 9, wherein said carbon fibers are in the form of a carbon fiber felt.

* * * * *